US010751666B2

(12) United States Patent
Chardon et al.

(10) Patent No.: US 10,751,666 B2
(45) Date of Patent: Aug. 25, 2020

(54) DISTILLATION APPARATUS WITH CARTRIDGE AND USE THEREOF FOR DISTILLING WATER

(71) Applicant: Cevap Technology B.V., Veldhoven (NL)

(72) Inventors: Merlijn Chardon, Eindhoven (NL); Beatrice Marinello, Eindhoven (NL); Hein Weijdema, Helmond (NL)

(73) Assignee: CEVAP TECHNOLOGY B.V., Veldhoven (NL)

( * ) Notice: Subject to any disclaimer, the term of this patent is extended or adjusted under 35 U.S.C. 154(b) by 0 days.

(21) Appl. No.: 16/349,643

(22) PCT Filed: Nov. 22, 2017

(86) PCT No.: PCT/EP2017/080079
§ 371 (c)(1),
(2) Date: May 14, 2019

(87) PCT Pub. No.: WO2018/095976
PCT Pub. Date: May 31, 2018

(65) Prior Publication Data
US 2019/0344193 A1    Nov. 14, 2019

(30) Foreign Application Priority Data

Nov. 22, 2016   (NL) ...................... 2017839

(51) Int. Cl.
*B01D 61/36*   (2006.01)
*F28D 9/04*    (2006.01)
(Continued)

(52) U.S. Cl.
CPC .......... *B01D 61/364* (2013.01); *B01D 1/065* (2013.01); *B01D 1/26* (2013.01); *B01D 1/30* (2013.01);
(Continued)

(58) Field of Classification Search
CPC . B01D 1/065; B01D 1/22; B01D 1/26; B01D 1/30; B01D 3/008; B01D 5/0006;
(Continued)

(56) References Cited

U.S. PATENT DOCUMENTS 3,822,192 A * 7/1974 Brown ................. B01D 1/22
                                              203/49
3,882,934 A   5/1975 Knoos et al.
(Continued)

FOREIGN PATENT DOCUMENTS

WO    03074959 A2   9/2003

OTHER PUBLICATIONS

International Search Report and Written Opinion for the International Patent Application No. PCT/EP2017/080079, dated Feb. 23, 2018, 14 pages.

*Primary Examiner* — Jonathan Miller
*Assistant Examiner* — Gabriel E Gitman

(57) ABSTRACT

A distillation apparatus includes at least one evaporation space in which feed water is evaporated into a vapour and at least one condensation space, in which vapour from a preceding evaporation space is condensed into distillate. The evaporation space and the condensation space each include a chamber and a plurality of interdigitated pockets arranged between said chambers, such that a first pocket of the evaporation space is present between a first and a second pocket of the condensation space, and that the first pocket of the condensation space is present between the first and a second pocket of the evaporation space. The spaces are mutually separated by means of a separation barrier that is configured for transmission of heat and for definition of the interdigitated pockets.

20 Claims, 7 Drawing Sheets

Figure 1:
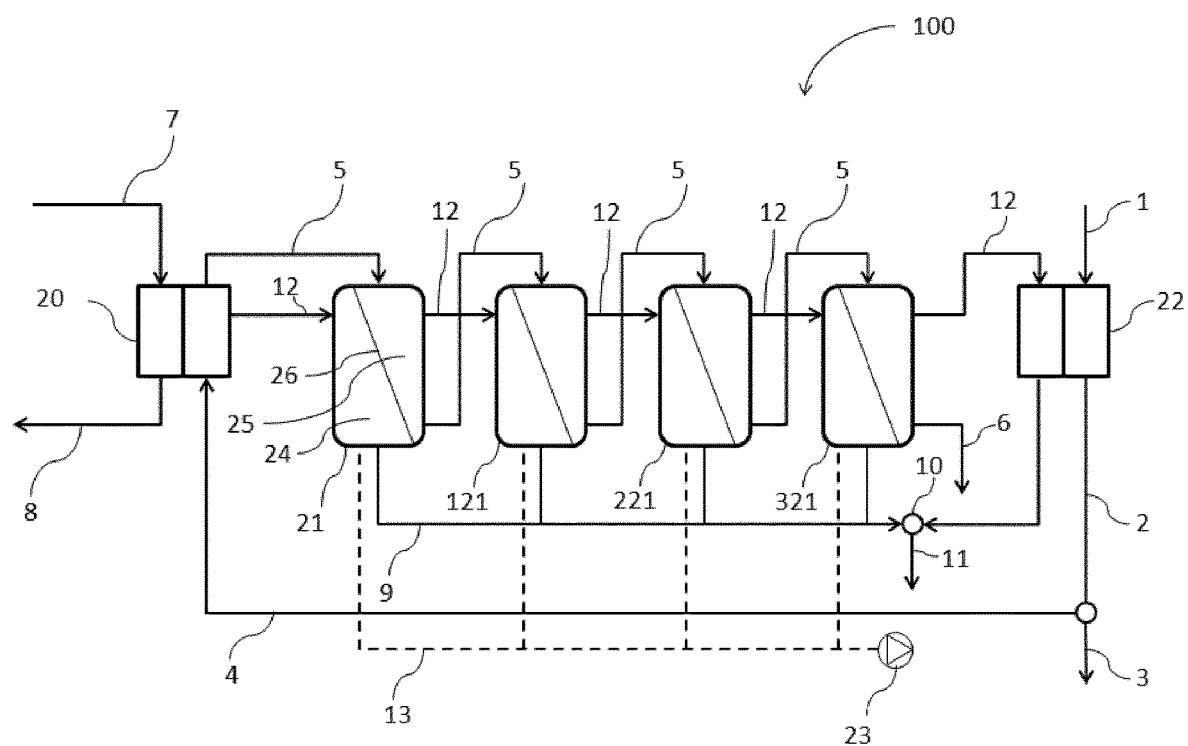

(51) Int. Cl.
- *B01D 1/06* (2006.01)
- *B01D 1/26* (2006.01)
- *B01D 1/30* (2006.01)
- *B01D 5/00* (2006.01)
- *C02F 1/04* (2006.01)
- *C02F 1/08* (2006.01)
- *C02F 103/08* (2006.01)

(52) U.S. Cl.
CPC ........... *B01D 5/0006* (2013.01); *B01D 5/006* (2013.01); *B01D 5/0039* (2013.01); *C02F 1/048* (2013.01); *C02F 1/08* (2013.01); *F28D 9/04* (2013.01); *C02F 2103/08* (2013.01); *C02F 2201/006* (2013.01); *C02F 2303/10* (2013.01)

(58) Field of Classification Search
CPC .... B01D 5/0021; B01D 5/0039; B01D 5/006; B01D 61/364; C02F 1/041; C02F 1/048; C02F 1/08; C02F 2201/006; C02F 2303/08; C02F 2303/10; F28D 9/04

See application file for complete search history.

(56) References Cited

U.S. PATENT DOCUMENTS

| | | | | |
|---|---|---|---|---|
| 4,585,523 A | * | 4/1986 | Giddings | B01D 1/22 159/13.1 |
| 4,863,567 A | * | 9/1989 | Raley | B01D 1/0017 202/182 |
| 5,062,927 A | * | 11/1991 | Stout | B01D 1/16 203/89 |
| 6,132,613 A | * | 10/2000 | Hopkin | C02F 1/441 210/321.68 |
| 7,459,084 B2 | * | 12/2008 | Baig | B01D 53/22 210/175 |
| 2014/0332365 A1 | | 11/2014 | Zebuhr | |

* cited by examiner

DISTILLATION APPARATUS WITH CARTRIDGE AND USE THEREOF FOR DISTILLING WATER

This is a national stage application filed under 35 U.S.C. § 371 of pending international application PCT/EP2017/080079 filed Nov. 22, 2017, which claims priority to Netherlands patent application NL 2017839, filed Nov. 22, 2016, the entirety of which applications are hereby incorporated by reference herein.

FIELD OF THE INVENTION

The invention relates to a distillation apparatus, comprising a distillation stage having an inlet for feed water, a distillate outlet and a brine outlet, at least one evaporation space in which feed water is evaporated into a vapour and at least one condensation space, in which vapour from a preceding evaporation space is condensed against a condensation wall into distillate and is thereafter transported to the distillate outlet, wherein remaining non-evaporated feed water is transported to the brine outlet.

The invention also relates to the use of the distillation apparatus for the distillation of an aqueous solution, particularly to obtain drinking water and/or process water for industrial application, and for concentration of waste water from industrial, agricultural or domestic processes.

BACKGROUND OF THE INVENTION

Currently used water treatment systems are generally based on either mechanical, chemical, biological, ion exchange and/or thermal treatment. Typical examples of these treatments are filtering and centrifuge treatments; flocking, use of resin beds and evaporation of water or volatile components respectively. The thermal treatment takes up a comparatively large share of the market of water treatment systems. In fact, a lot of waters exist that can only be treated effectively using thermal treatment, because of the presence of components that make chemical, ion-exchange or mechanical treatment impossible. Examples of such waters are waters that contain very small particles, biological active substances, or dissolved solids. This limitation can relate to the actual physical limitations of these treatment technologies, but can also be of an economic nature. A very high consumption of electrical energy typically prohibits an economically feasible use.

Two major types of thermal treatment systems are known, which are vapour-compression and multi-Effect Distillation (MED). In vapour compression, vapour that is formed as a result of a boiling process, is compressed in a mechanically driven compressor, and is used to pre-heat the incoming feed flow. This type of vapour-compression evaporator has a high capital cost, and is driven by electrical energy, and are economically applicable for higher concentrations of water, and for medium/high water volumes. In MED, use is made of high-grade thermal energy sources, like superheated steam. The thermal energy thereof is reused several times to evaporate water, in a sequence of 'effects' or stages that are sequentially operated at a lower pressure. Vapour generated in a first stage by means of evaporation from feed water is condensed against a condensation wall in a subsequent stage. The latent heat is transmitted again to feed water that is therewith evaporated. This reuse should in itself lead to higher thermal efficiency, but their typical structure, made out of metals like stainless steel, is sensitive to corrosion and requires high maintenance demands.

A variation on the MED principle is multi-effect membrane distillation, such as known from WO2005/089914A1. Herein, the condensation wall is arranged adjacent to a liquid channel, which again is closed by means of a membrane. Evaporation of the liquid allows the vapour to leave the liquid channel via the membrane. Both an implementation based on circular extension of foils and an implementation based on parallel arranged foils is presented. This variation of MED creates a bigger contact area between vapour and liquid and seems a suitable solution. However, the migration of vapour through the membranes tends to cause depositions of salts or organics-based fouling components. Furthermore, the membrane needs to be positioned and fixed by a frame. Both the frame and the membrane may be made of polymer material. Given the high temperatures up to the boiling point and the lower pressures, the polymer material is subject to expansion. This tends to cause reliability and maintenance issues.

Another variation on the MED treatment system is known from US2014/0042009A1. Herein the membranes have been replaced by layers of wicking material. More particularly, such layers allow the feed water to flow through the layer. As a consequence, no membrane is needed, which simplifies the construction. In the said application, the distance between the wicking layer with the feed water and the condensation wall is reduced to a small gap and a circular configuration is chosen. Some discrete spacer is arranged into the gap so as to avoid that the wicking layer would attach to the condensation wall. Clearly, in this configuration of a plurality of effects within a single stack or roll of foils, no gradually reducing pressure can be applied. This is a major limitation, as the reduction in pressure from stage to stage is one of the drivers to continue the distillation process. Moreover, notwithstanding the observations, it appears that there is still a risk of carry-over of feed water to the distillate, since the two liquid streams are arranged at the surfaces that face each other and are merely separated by the gap. It would of course be possible to enlarge the size of the gap between the wicking layer and the condensation wall, but this immediately leads to a reduction in the effective surface area per unit of volume.

A further system is known from US2014/0332365A1. This application discloses a distiller with an evaporation surface for evaporating liquid into vapour. Around a vertical central longitudinal axis alternating evaporation channels and condenser channels are present. Each of said evaporation channels has two opposed evaporation surfaces. Each condenser channel is provided with two opposed condensing surfaces. A motorized rotary assembly is present including a rotor and a pump for applying the heated liquid from a sump at a bottom of the housing to a moving applicator device that applies heated liquid in a thin film onto the evaporation surfaces with wipers. In this system, the evaporation channels constitute closed chambers. Between the closed chambers, the condensing channels extend. The heating liquid (i.e. the feed) and the condensing vapour running in the same direction, from top to bottom.

Figure 8:
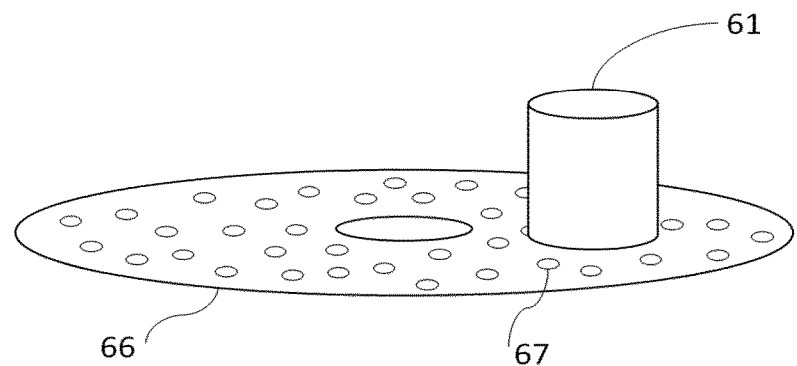

As is visible in FIG. 8 of the application, both the evaporating channel and the condensing channel are provided with a variety of structures and elements, referred to as vertical irrigation channels, elongate retaining structures having a corrugated shape and corrugations to provide elongate vertically extending or upright retaining grooves or recesses. This makes the construction, together with the rotor for rotation of liquid a complex and expensive. Apparently, these structures and the rotary movement are needed so as to ensure that liquid films will be retained at the evaporating and condensing surfaces during operation. Moreover, the structures seem to increase adhesion and deposit of contaminants in the feed within the evaporation channel. As a consequence, there is quickly a need for cleaning, unless the use is limited to liquids that are rather pure mixtures. As such, the effective operation time of the apparatus is deemed to be rather low.

SUMMARY OF THE INVENTION

It is therefore an object of the invention to provide an improved apparatus for multi-effect distillation which is less susceptible for maintenance issues due to thermal expansion of membranes and other foils and/or due to salt or organic deposits. Particularly, it is desired that the vacuum or a lowered pressure can be applied to the apparatus and that the effective density is high enough.

Thereto, according to a first aspect, the invention provides a distillation apparatus, comprising a distillation stage having a container provided with at least one evaporation space in which feed water is evaporated into a vapour and at least one condensation space, in which vapour from a preceding evaporation space is condensed against a condensation wall into distillate and is thereafter transported to the distillate outlet. Herein remaining non-evaporated feed water is transported to the brine outlet. According to the invention, the evaporation space and the condensation space are each configured to comprise a chamber and a plurality of interdigitated pockets arranged between said chambers, such that a first pocket of the evaporation space is present between a first and a second pocket of the condensation space, and that the first pocket of the condensation space is present between the first and a second pocket of the evaporation space, wherein the evaporation space and the condensation space are mutually separated by means of a separation barrier that is configured for transmission of heat, wherein said separation barrier is configured to define the interdigitated pockets. Herein, the container is embodied as a vessel comprising a feed inlet, a distillate outlet and a brine outlet, and any optional vapour inlet and vapour exit, said vessel further being provided with mounting means for mounting a cartridge comprising said separation barrier.

The apparatus of the invention is based on another operation principle than the prior art MED-type apparatus. Herein, a container for a single stage is subdivided between an evaporation space and a condensation space, which are mutually separated by means of a separation barrier that is provided in a specific form. This leads to an arrangement with a first and a second chamber separated by means of a plurality of interdigitated pockets. The first and second chambers serve to respectively provide and remove flows of vapour. This leads thereto, that the primary flow directions of vapour and liquid within a single pocket are in mutually opposed directions, whereas the primary flow direction of vapour and liquid in the prior art is rather in the same direction and/or perpendicular to each other.

This subdivision of the single stage is furthermore according to the invention a subdivision between a durable element and a cartridge to be installed in the durable element. The durable element is the vessel, which further contains any inlet and outlet. The disposable cartridge essentially comprises the separation barrier defining the interdigitated pockets. In order to arrange the cartridge adequately, the vessel is provided with mounting means. The cartridge is suitably a cartridge that is disposed as waste material after its use. However, the cartridge may alternatively be a cartridge that can be cleaned separately.

More particularly, in accordance with the invention, feed water will flow down along the barrier in the evaporation space towards the bottom, releasing vapour that rises up. Incoming vapour will enter the pockets in the condensation space from the bottom or sidewise. Particularly when entering from the bottom side, the vapour will be pulled up by a volume reduction effect of the condensation of the vapour against the condensation wall in the pockets. This configuration results in a counter flow between the vapour in the condensation space and the feed water flow in the evaporation space. Such a counter flow leads to an optimal thermal energy exchange, due to the temperature distribution in the feed water on one side, and the temperature distribution of distillate and vapour on the other side of the separation barrier.

It is believed by the inventors that the counterflow of the vapour in the evaporation space relative to the falling liquid film contributes to or even ensures adherence of the liquid film onto the evaporation surface. The vapour generates a pressure that seems to counteract that the liquid film is divided into droplets or would form a beam. It is understood that a wicking layer as used in a preferred embodiment further contributes to this adherence of the liquid film. However, an alternative to a wicking layer such as a support layer with a surface texture may also be sufficient in combination with the counterflow of the vapour.

The resulting produced vapour rises inside the evaporation space, and is collected in the evaporation chamber. The vapour is then removed from the evaporation space by means of a vapour output connection.

For sake of clarity, it is observed that the pockets of the evaporation space may be mutually connected, so as to form a single spiral-shaped cavity. Similarly, the pockets of the condensation space may be mutually connected, so as to form a single spiral-shaped cavity. However, it is alternatively feasible that the pockets are cylindrical. It is furthermore feasible that a spiral shaped cavity is subdivided from inside to outside of the spiral shape. The use of spiral-shaped cavities is understood to facilitate easy manufacturing, in that the foils defining such cavities can be rolled up around a central cylinder.

In a preferred embodiment, said at least one evaporation space is provided with a wicking layer of hydrophilic material, through which feed water flows, and an adjacent vapour channel, wherein the condensation wall and the wicking layer are embodied as a sheet material, which is arranged such that the wicking layers are present in the pockets of the evaporation space and the condensation walls are present in the pockets of the condensation space. While it is not excluded that a membrane is used, this is deemed to result in more complexity without much gain. More particularly, as compared to the prior art, this embodiment is based on a mirror-wise ordering of first and second portions of the sheet material. Other than in the prior art where a liquid layer and a condensation wall are repeatedly alternated, the invention is arranged thereon that a pair of liquid layers is arranged between pairs of condensation walls, and this repetitively.

The term 'wicking' has been defined in scientific literature as the spontaneous transport of a liquid through a porous medium as a result of capillary suction taking place at liquid-gas interfaces at the surface or within the porous medium (S. Beyhaghi et al, *AIChE Journal*, 60(2014), 1930-1940). The term 'wicking layer' is used in the context of the present application as a layer through which and on an outer surface of which wicking occurs. Furthermore, in the current set up, liquid feed enters the porous medium from the top, resulting in liquid flow along the outer surface of the medium. It is believed by the inventors that the capillary action within the porous medium, and thus the presence of liquid therein, contributes to keeping the liquid at the outer surface of the porous medium. It seems probable that this stabilizing effect of a liquid film is further enabled in that the falling velocity of the film gradually and differentially decreases from the outer surface of the liquid film towards the surface between the wicking layer and the underlying sheet material, and that the falling velocity is above zero at the outer surface of the wicking layer. It is observed that a variety of hydrophilic porous media are known that enable wicking. Such media may be composed of polymer material, of inorganic material, such as silicates, borosilicate glass, zeolites and other ceramics, which optionally may be modified with organic groups, and also in the form of metallic structures. An example of the latter is a so-called Dutch-Twilled weave (DTW) as commercially available from Spörl KG, Germany, as described in N. Fries et al, The effect of evaporation on the wicking of liquids into a metallic weave. J. Colloid Interf. Sci., 321(1):118-129, 2008.

The wicking layer is suitably fibrous and porous. This has the advantage that the feed water flow is further based on a capillary effect of the wicking material. Typical examples of wicking materials are cellulose-based paper or cardboard materials, or synthetic based wicking materials made with for example viscose fibers and optionally coated polyester fibers. Extensive testing of these materials has shown that they have a thermal conductivity that is sufficient for the transport condensation of the heat from one surface, i.e. the condensation wall, into the feed water on the other side of the surface. Suitably, the materials have a thickness of less than 1 mm, preferably less than 250 μm. When using this wicking material, one side of the sheet is left in its natural hydrophilic state, to act as the evaporation surface. At this side, the feed water runs over the surface through a thin film, and releases water vapour.

Rather than using a separate wicking material, a structure supporting a liquid film may be generated by means of surface modification of a hydrophilic layer. One embodiment of a surface modification is the formation of texture at the surface, such as embodied by grooves and cavities. This can be achieved by means of a roughening treatment such as for instance by grinding. First indications of the thickness of the liquid film in one embodiment of the invention were less than 500 μm, such as in the range of 150-400 μm, for instance 250-300 μm. It is well feasible to create a surface texture with a profile with a depth up to said range, for instance from 100-250 μm.

Rather than using a fibrous material, any porous layer may be deposited on top of a support layer, which is preferably hydrophilic. Examples of porous materials and their depositions are well known per se. Examples include polymer foams and inorganic materials. Examples include zeolites and silica-type materials. For silica-materials, it is for instance known to control properties of the resulting film by selective modification of precursor materials and deposition in a sol-gel process. Examples of very porous materials are for instance aerogels and mesoporous silica materials.

In first experiments with the embodiment using a evaporation surface with a fibrous wicking material, an unexpectedly high heat transfer coefficient was observed. Furthermore, it was found in experiments with said embodiment that the heat transfer coefficient is largely independent of the feed flow rate. This is deemed highly beneficial in that any user may choose a concentration factor of the feed without major impact on the operation of the apparatus.

Suitably, the separation barrier is further provided with a layer that is impermeable for the feed water and/or any components thereof, such as salts. The impermeable layer may be an impermeable and suitably hydrophobic coating, such as for instance a wax or a latex. The impermeable layer may alternatively a sheet material that is based on a plastic, like for example a polypropylene or polyurethane, in the shape of a foil. The thickness of the impermeable layer is typically less than 100 μm, for instance 5-30 μm. Thus, overall, the separation barrier may be a laminate of a hydrophobic sheet material and a wicking layer, or a coated wicking layer. The separation barrier may even be a wicking layer without impermeable layer. The wicking layer is then suitably configured to be substantially impermeable for salts and/or the aqueous solution, for instance by tuning its thickness and density and/or by providing a one-sided treatment that increases the density of the condensation wall. The latter embodiment is deemed feasible for applications wherein the feed water is concentrated to reduce its volume, rather than for the production of demineralized water, or for applications wherein the distilled water does not need to be pure.

In one implementation, the arrangement of the evaporation chamber, the plurality of interdigitated pockets and the condensation chamber constitutes a vertical stack, with the condensation chamber at a bottom side and coupled to at least one vapour inlet and a distillate outlet, and the evaporation chamber at a top side and coupled to a vapour exit and to a feed water inlet. The term 'vertical stack' is herein used to identify the mutual order and layout of the constituting chambers and pockets. The advantage hereof is that gravity can be used to ensure that liquid films fall down along the evaporation surfaces of the pockets of said evaporation space. Rather than a vertical stack, a horizontal stack or another orientation is not excluded. The vertical stack appears suitable in combination with a spiral configuration of sheet materials.

More generally, the container is provided with an inlet for feed water, a distillate outlet and a brine outlet. The distillation stages is therein provided and configured so as to make that the liquids are led from or to the evaporation or condensation space. More particularly, the feed water is transmitted from the inlet to the evaporation space. The remaining non-evaporated feed water is transported from the evaporation space to the brine outlet. The distillate is transported from the condensation space, and particularly any condensation wall therein against which condensation occurs Suitably, a brine channel is present at a bottom of the evaporation space for transportation of remaining non-evaporated feed water towards the brine outlet. More particularly, such brine channel is arranged inside the interdigitated pockets and would extend laterally or radially (dependent on the configuration of the sheet materials) to connect all pockets in the evaporation space. The brine channel would end up in a brine outlet or in any further channel extending towards said outlet.

In a further suitable embodiment, a water distributor is present on top of the evaporation chamber. The water distributor more preferably is embodied as a plate with a plurality of small holes and configured for spreading the feed water through the evaporation space, for instance in the form of droplets. In an alternative embodiment, the water distributor is ring-shaped, which allows that the feed is supplied into the space within the ring-shaped water distributor. Thus the feed is supplied in a radial direction, or in a direction including both a radial and an axial component.

The radial direction will typically be in a horizontal plane and the axial component will be in a vertical plane. It is not excluded that the water distributor has supplementary apertures for supplying the feed also into other directions, for instance downwards. Further alternative embodiments for the water distributor such as an array of channels with orifices, are not excluded. Nozzles may be present to create an optimal distribution, but that is not deemed necessary. In an alternative embodiment, the distributor plate is a so-called rain plate. In a further embodiment a feed water reservoir is present on top of the rain plate. Mixing means may be present in the feed water reservoir so as to create flow patterns in a radial or lateral direction.

The said configurations of the water distributor so as to create flow patterns in a radial or lateral direction (including said rain plate with a mixed reservoir or a ring-shaped water distributor with sidewise located orifices or nozzles) is deemed beneficial for the distribution. It results therein that the water does not merely fall down through the rain plate but also has a lateral or radial speed. It has been found that the use of the evaporation chamber for downwards transmission of feed water, particularly as droplets or jets, does not interfere with the upwards transmission of vapour. Particularly, no substantial contamination or no contamination of the vapour occurs.

The inventors believe that the solids in the feed water are hydrated and physically bound to the water, which prevents any diffusion into the vapour phase. This understanding has been confirmed by measuring the conductivity of the produced distillate and comparing it to the conductivity measured in the feed tank. Use was herein made of a portable conductivity meter, and making use of the ring-shaped water distributor as further shown in FIGS. 12 and 13. The conductivity in the distillate was found not to exceed 20 µS/cm. The conductivity in the feed tank was at least 300 µS/cm. When the conductivity of the feed was raised by addition of common salt (sodium chloride), no increase in the conductivity of the distillate was observed.

It is observed that the spraying or other distribution of the feed into the evaporation space is to generate jets or droplets rather than to evaporate feed, so as to prevent that contaminants in the feed are carried with the vapour into the vapour outlet (or steam outlet). While such sprayed droplets are deemed to end up into and on the surface of the wicking layer, it is not excluded that a portion of the sprayed droplets fall into the interdigitated pockets and may partially evaporate in exchange with the vapour flow rising therein. The measured conductivity of the distillate demonstrates that such presence and exchange does not lead—at least not significantly or not substantially—thereto, that such droplets of feed would be incorporated into the distillate flow. Such sprayed and falling droplets entering a pocket will still end up in or on the wicking layer, but at a lower location rather than at the top.

In again a further embodiment, adjacent sheets of the sheet material are spaced apart by means of a spacer grid. These spacer grids have the function of defining the space between the sheets of the separation barrier, but also be a structural member, so as to withstand the pressure and temperature effects of the distillation process. In one suitable implementation the spacer grid has a thickness of less than 1 cm, for instance 4-8 mm, depending on the exact spacer grid layout and material chosen.

It is deemed suitable that the spacer grids are further present between an outer portion of the sheet material and the container. Therewith a further protection is obtained. Moreover, this allows that a connector to a pressure line defining the pressure within the container is present at a level configured for the interdigitated pockets, rather than in the evaporation chamber or the condensation chamber. It is observed that the sheet material and the spacer grids are not necessarily connected or related in any way to each other, and can be chosen separately to achieve a layout which has certain necessary dimensions, thermal properties, or other required properties with respect to the distillation process or feed water quality or quantity that is used in the distillation process.

In one implementation, the spacer grid inside the evaporation space is of a different thickness than the spacer grid applied in the condensation space. Furthermore, the material of the spacer grid and the shape of the grid may be varied. Preferably, the spacer grid inside the evaporation space comprises a hydrophilic material, with the effect that the surface of the spacer grid becomes part of the total evaporative surface. The shape of the spacer in the evaporation space is suitably chosen such that it will assist to distribute the feed water over the chamber's walls. In another preferred embodiment, the spacer grid in the condensation chamber contains a hydrophilic material, which has the effect that it will attract condense drops off the chamber's walls. This results in a faster and more efficient condensation process and thus higher heat transfer towards the adjacent evaporation space.

In accordance with the invention, the vessel is equipped with all necessary connections for fluid- and gas-inputs and outputs to support the condensation and evaporation process inside the vessel, where these connections are positioned in such location that—preferably optimal—operational conditions for each effect are achieved. The intended use and position of the vessel within the distillation apparatus is permanent: it is not a consumable, and its intended useful life time within the distillation apparatus is equal or close to the total system life time. The vessel is equipped with the necessary accessibility means for easy access to the cartridge installed inside the vessel, to make fast cartridge exchanging possible, resulting in minimal system downtime.

The cartridge is designed for use during a predefined operation time at typical operation conditions of a distillation process. Furthermore it is designed so as that it can be positioned within a vessel.

Optionally, the cartridge may be provided with positioning means that cooperate with the mounting means, for instance in that the positioning means have a shape that is complementary to that of the mounting means. However, this is not deemed necessary. Particularly in a spiral configuration of the foils that constitute the separation barrier, it is deemed sufficient that an inner cylinder in the cartridge can be positioned on, around or in the mounting means, while an outside of the cartridge will be effectively clamped within the outer wall or further mounting means of the vessel.

Preferably, the cartridge comprises the separation barrier in a spiral configuration around an inner hollow cylinder, which cylinder is mountable on said mounting means of the vessel. This is a construction that facilitates placement of the cartridge.

In one further implementation, the vessel is provided with a core cylinder onto which said mounting means are arranged, which core cylinder preferably defines a flow path for vapour from a vapour inlet towards the condensation space. Such a core cylinder ensures that the overall construction is sufficiently strong to withstand the variation of pressure during use. When the core cylinder is hollow, it is furthermore feasible as a flow path for one or more flows of liquid or vapour. In one preferred option, it is used as a flow path for the vapour running between a vapour inlet and the condensation space. In an alternative option, it is used as a flow path for the vapour running between the evaporation space and a vapour outlet.

In a further implementation, a space between the core cylinder and the inner hollow cylinder and any cylinder arranged in the vessel below said inner hollow cylinder constitute a brine flow path for flow of non-evaporated feed water from the brine channel towards the brine outlet. This implementation facilitates flow of non-evaporated feed water with limited or even minimum risk of contamination of distillate. Preferably, the brine flow path continues towards a brine outlet via a further compartment within the vessel or below the vessel to the brine outlet. Alternatively, the brine outlet may be at the end of said space between the core cylinder and the other cylinders. A tube, pipe, container or other holding means can be connected to the brine outlet.

In again a further implementation, the vessel has an upper compartment that is provided with the feed inlet, and which is further provided with a water distributor for distributing feed water onto evaporation surfaces in the evaporation space. Said evaporation surfaces are more particularly wicking layers. It is believed that both the suitably fibrous and also porous wicking layer of hydrophilic material and any spacer grid in the evaporation space pulls the heated feed water in and towards the separation barrier.

Preferably, such upper compartment is configured so as that any feed therein is during use kept at a higher pressure than the remainder of the vessel. A suitable pressure for the upper compartment is for instance 0.5-3 bar (absolute), preferably 0.8-2 bar. The remainder of the vessel will be at a reduced pressure during operation. Herewith, a pressure difference to the vessel can be set so as to ensure that the feed will leave said upper compartment at any desired flow rate. The water distributor may be implemented with apertures and/or with spraying nozzles. The number of spraying nozzles per vessel is dependent on its size and is typically less than 10, for instance 2-6.

In a suitable implementation, the mounting means include a carrier means for carrying said inner hollow cylinder at a predefined height above a bottom of the condensation space in the vessel. This is a practical manner for defining the height of the condensation chamber.

In a further embodiment, the layout of connections and the interior structure of the pressure vessel of an effect in the distillation apparatus is such that the produced vapour from the previous effect in the distillation apparatus, is directed towards the bottom part of the pressure vessel of the mentioned effect. The inflowing feed water is entering the pressure vessel at the top.

In the effect a cartridge is installed, constructed as described in the previous embodiments, where the condensation and evaporating chambers in this cartridge are sealed in such a manner that the condensation chambers are open at the bottom, and sealed at the top of the cartridge.

Preferably, a plurality of distillation stages are present as separate entities that are mutually coupled so as to transmit feed water and vapour, wherein particularly a pressure in a second distillation stage is—in use—maintained at a lower level than a pressure in a first distillation stage. This embodiment corresponds with a multi-effect distillation apparatus. This is known to have a higher efficiency than a single-effect distillation apparatus. However, a single effect, i.e. a single container, in combination with a further condenser is not excluded.

BRIEF INTRODUCTION OF THE FIGURES

Figure 3:
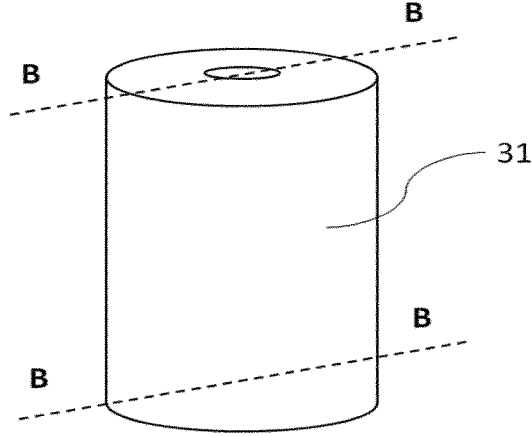
Figure 4:
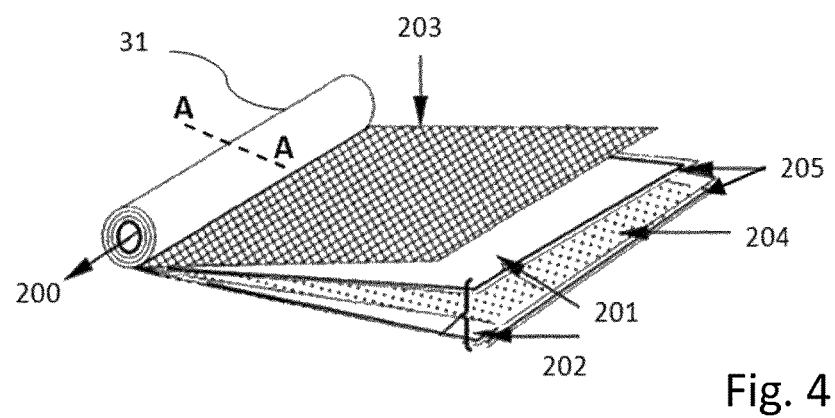
Figure 2:
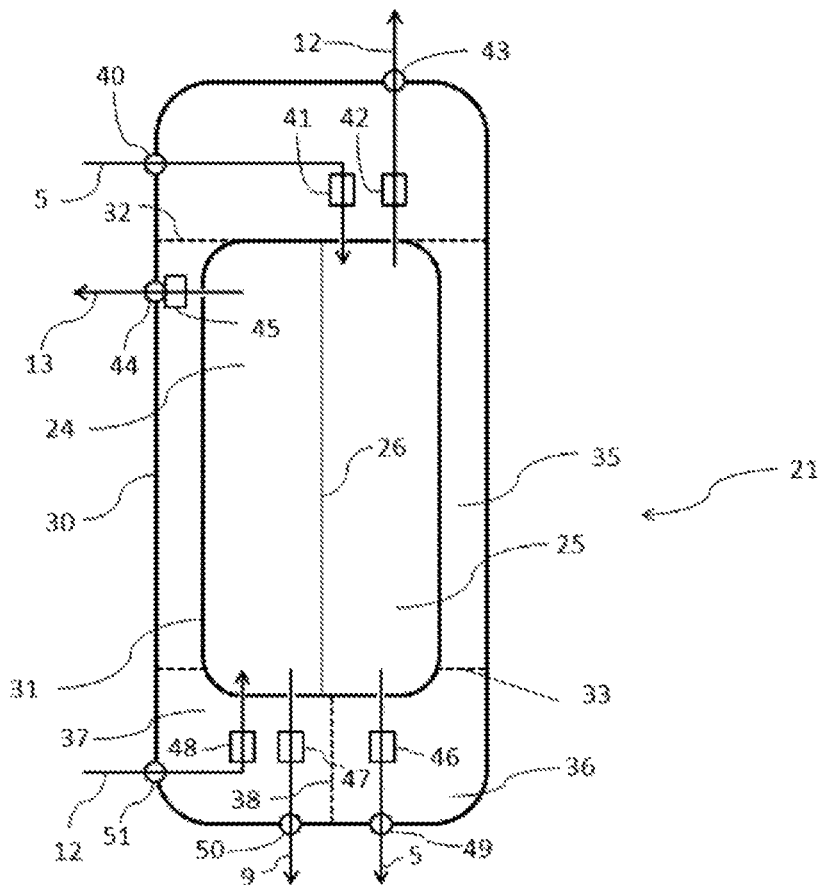
Figure 5:
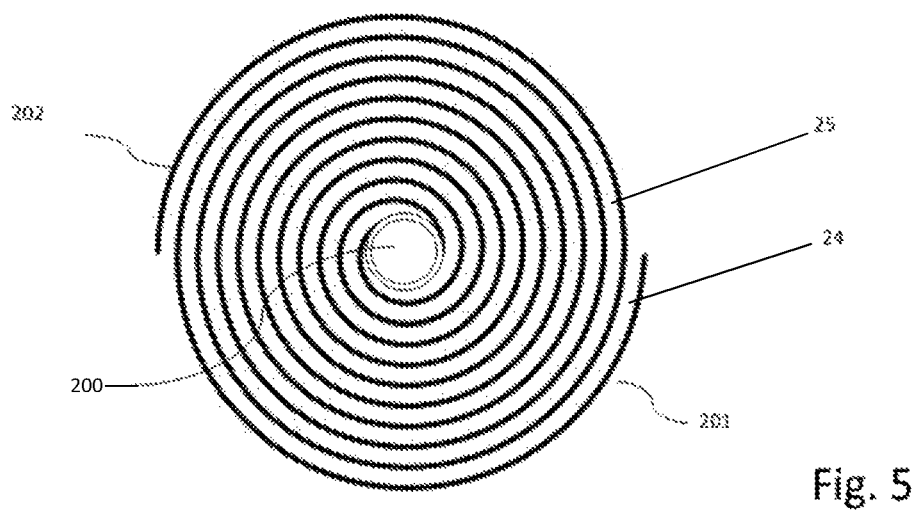
Figure 5A:
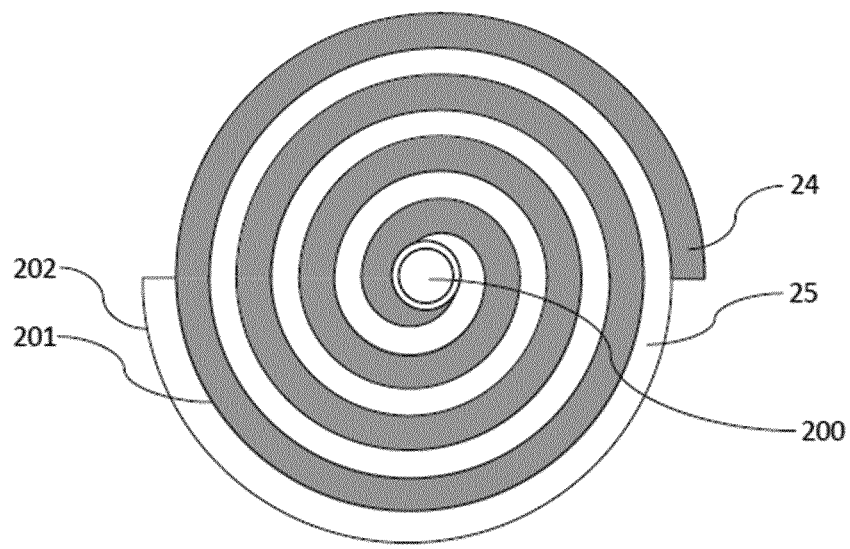
Figure 6:
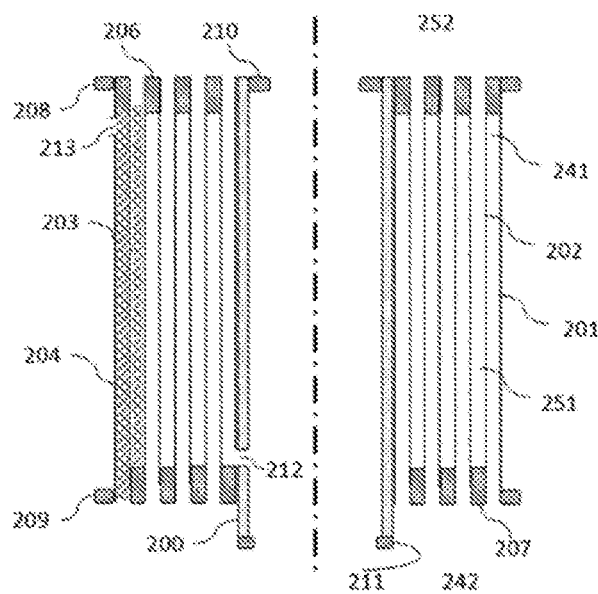
Figure 7:
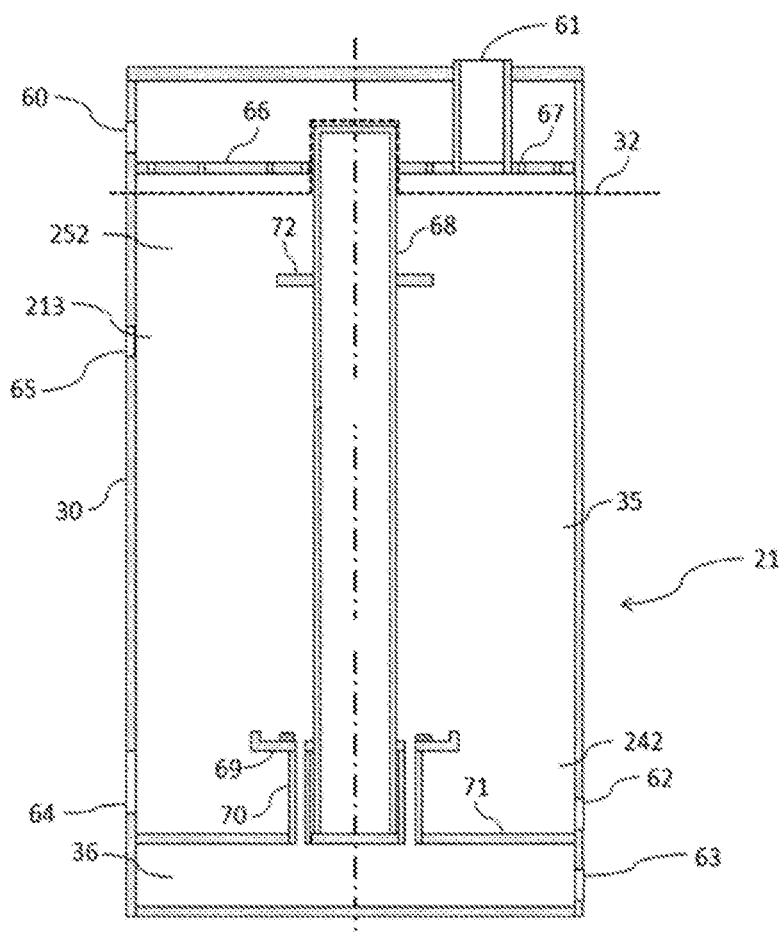

These and other aspects of the invention will be further explained and detailed with reference to the following figures:

FIG. 1 gives a schematic representation of a multi-effect distillation apparatus;

FIG. 2 shows a diagrammatical view of a first distillation stage comprising a vessel and a cartridge;

FIG. 3 schematically shows a cartridge in a first embodiment;

FIG. 4 schematically shows the cartridge of the first embodiment in a (partially) unrolled form;

FIG. 5 schematically shows a top view of the cartridge of FIG. 3;

FIG. 5A is a modified version of FIG. 5 in which the spiral chambers are shown schematically;

FIG. 6 schematically shows a cross-sectional view of the cartridge, the cross-section being indicated in FIG. 3 with the lines B-B;

FIG. 7 schematically shows a cross-sectional view of the vessel in a first embodiment, the cross-section corresponding to the one of FIG. 6

Figure 12:
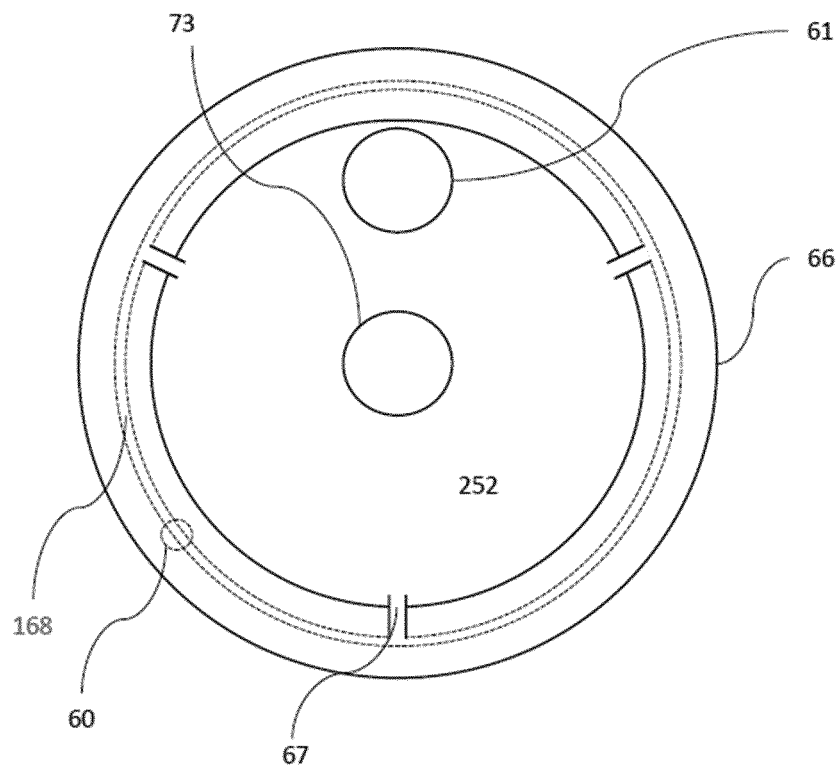
Figure 9:
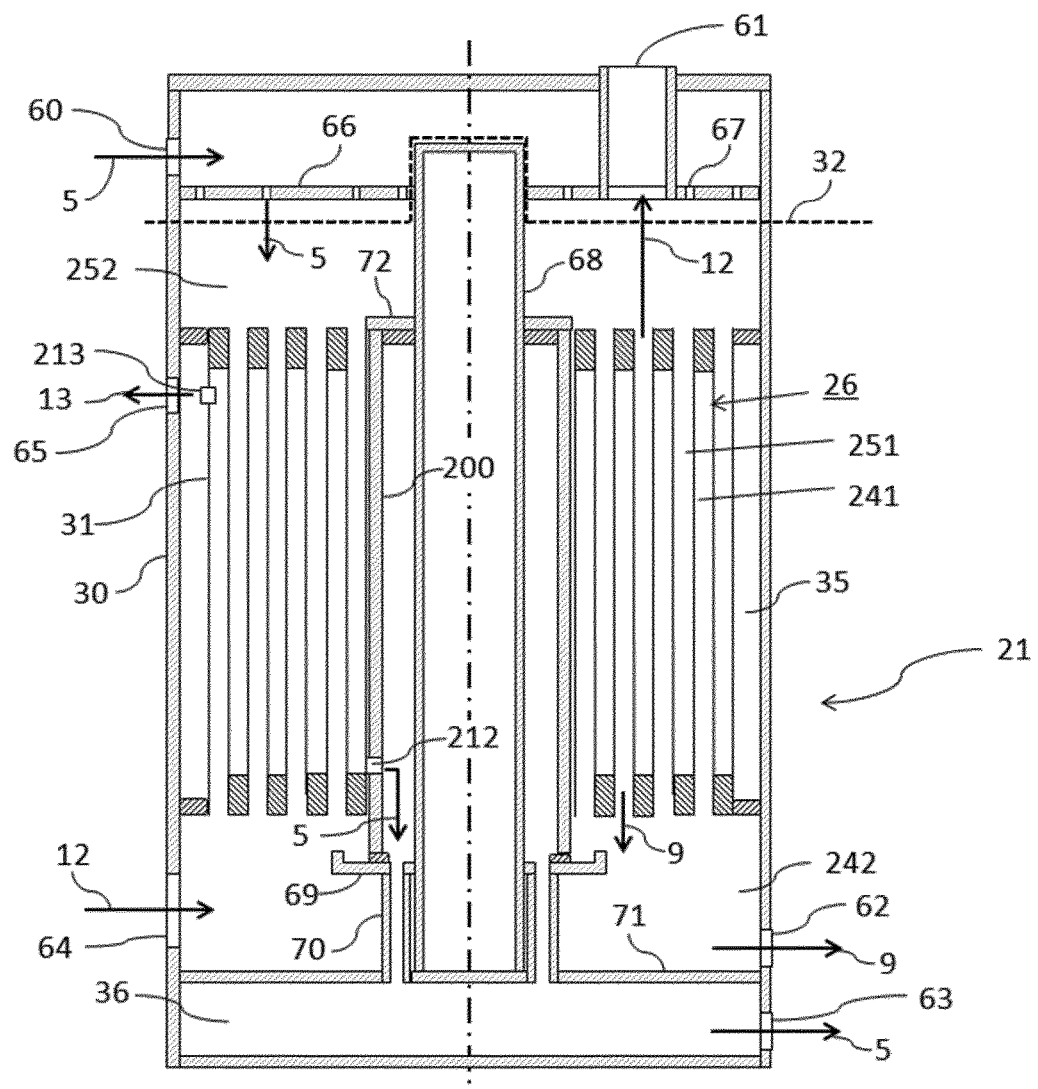
Figure 10:
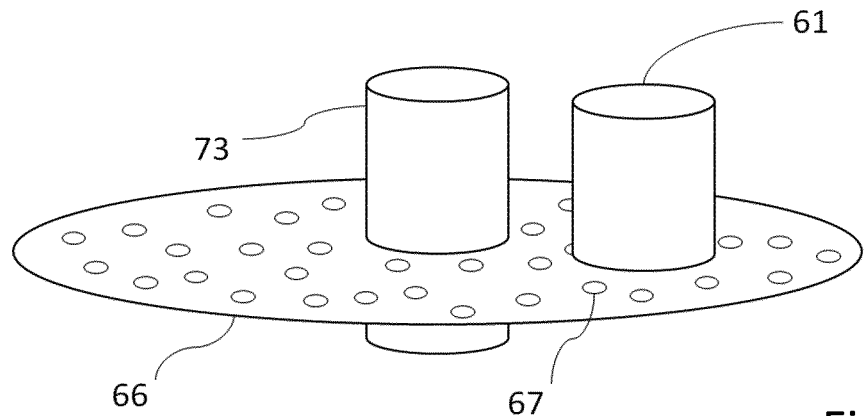
Figure 11:
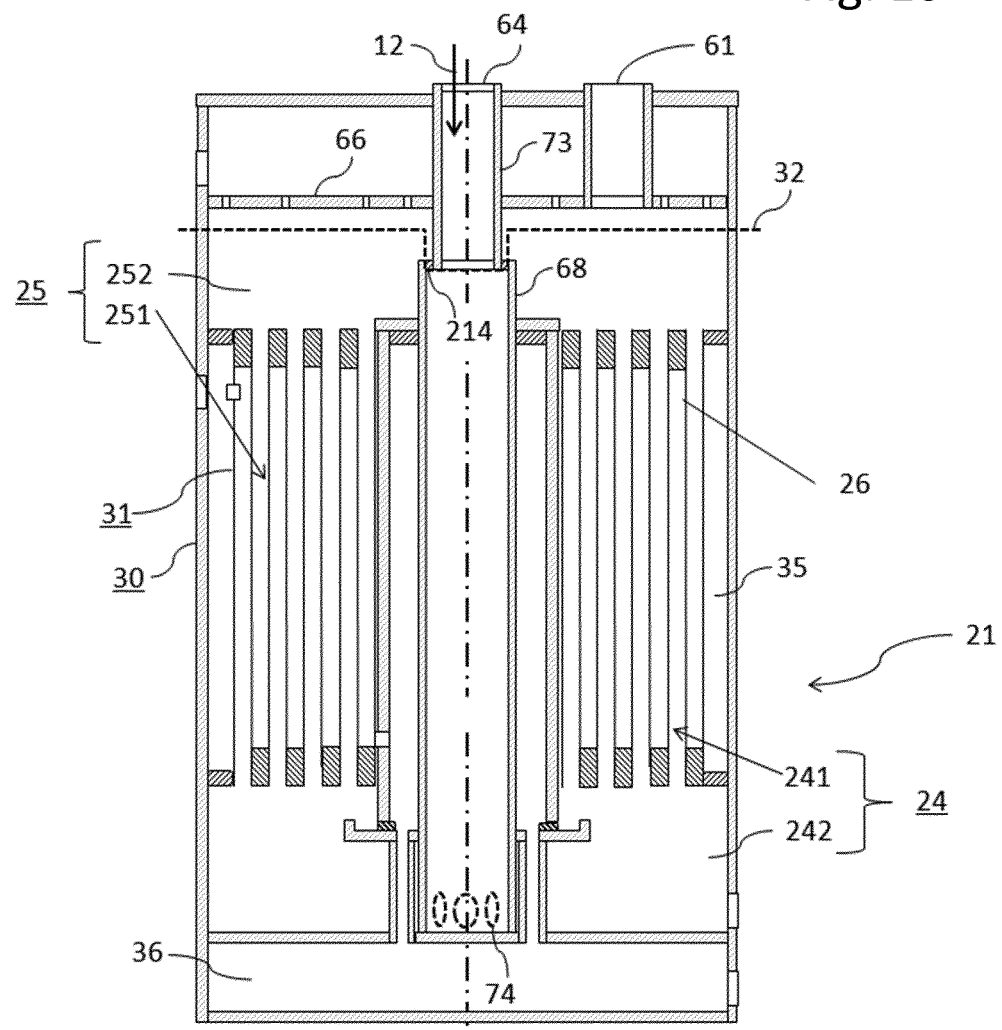
Figure 13:
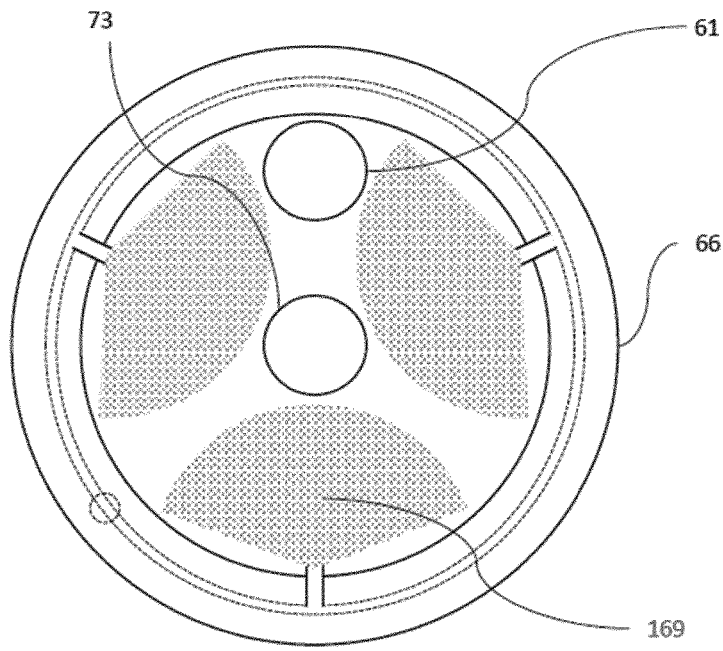
Figure 14:
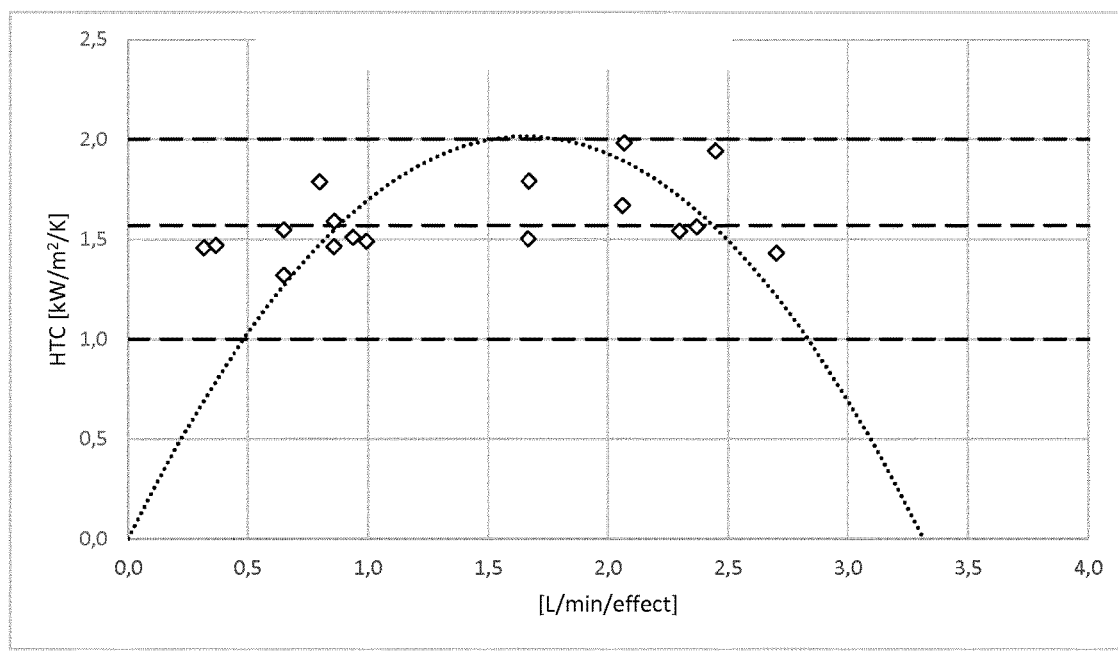

FIG. 8 schematically shows a first embodiment of a water distributor in a bird's eye perspective, which water distributor is also shown in FIG. 7;

FIG. 9 schematically shows in cross-sectional view the combination of vessel and cartridge as shown in FIGS. 6 and 7;

FIG. 10 schematically shows a second embodiment of a water distributor in a bird's eye perspective, FIG. 11 schematically shows in cross-sectional view the combination of a vessel of a second embodiment with the water distributor of FIG. 10 and the cartridge of the first embodiment as shown in FIG. 6;

FIG. 12 schematically shows a third embodiment of a water distributor in a bottom view;

FIG. 13 schematically shows the third embodiment of a water distributor in use, and FIG. 14 is a graph in which the heat transfer coefficient is shown as a function of the feed flow.

DETAILED DESCRIPTION OF ILLUSTRATED EMBODIMENTS

The figures are not drawn to scale and equal reference numerals in different figures refer to same or corresponding elements. Specific elements like connectors or interfaces are not necessarily drawn in their exact location or orientation.

FIG. 1 schematically shows a first embodiment of a multi-effect distillation apparatus 100. This multi-effect distillation apparatus comprises a plurality of stages 21, 121, 221, 321, also referred to as effects. In each effect 21, 121, 221, 321 the distillation process by means of evaporation and condensation process takes place. Each subsequent effect is operated at a lower pressure. Thereto, the effects 21, 121, 221, 321 are coupled by means of a vacuum line or circuit 13 to a pumping means 23. The pumping means 23 can be a conventional vacuum pump, but also for example a fluid driven venturi pump. More effects can be added to obtain highest thermal efficiency and highest clean water production or best concentration of the feed water. The total number of effects in a system 100 depends therefore on the heat supplied and the water treated, but out of operational and economical limitations the total number of effects is typically at least 2 and at most 10, preferably at least 4 and at most 6. Each effect can have a specific internal configuration depending on the location within system 100, for example with respect to evaporating surface, total volume, materials, and external connections. Notwithstanding, but each effect has an evaporation space 25, and a condensation space 24. Both spaces are separated by a separation barrier 26 including a condensation wall, which serves as a thermal conductor, transferring heat from the condensation space 24 to the evaporation space 25.

The multi-effect distillation system 100 is in the illustrated embodiment provided with two external interfaces for transfer of heat into and from the system. To transfer of heat into the first effect 21, a heating module 20 is used. To transfer heat out of the system 100, a cooling module 22 is used. The cooling module 22 is connected to an external cooling source, which can be either a completely independent cooling source like for example an evaporative cooler, or it can be the actual feed water that will be treated by the multi-effect distillation system 100. This can for example be the case when system 100 is used to produce drinking water from seawater: here the seawater is used as feed water but also as cooling water in the cooling module 22.

In FIG. 1 the feed water cooled version is shown. Feed water 1 herein enters the cooling module 22, and leaves this module as heated feed water flow 2. Flow 2 is then divided into feed water flow 4 that will serve as feed flow for the multi-effect distillation process, and surplus flow 3, which is not used and discarded. Pre-heated feed water flow 4 is now introduced into the heating module 20, where it is further heated, receiving thermal energy from an external heat source. To achieve this, the heating module 20 takes in flow 7, which is a heated medium, being either fluid or gas, where fluid is preferred because the higher thermal density of a fluid allows for a smaller volume module 20. Flow 7 releases its heat partly in the heating module 20, and leaves the heating module 20 as flow 8, with a lower temperature and heat content. Feed flow 4 is thus heated inside the heating module 20, and leaves the heating module 20 as hot feed, either in a pure liquid flow 5, or separated in a hot liquid flow 5 and a vapour flow 12. The ratio of separation of the feed flow into liquid 5 and vapour 12 depends on the configuration of the heating module 20 and the external heat quality and quantity stored in flow 7.

Both the liquid flow 5 and the vapour flow 12 are inserted into the first effect 21. The liquid flow 5 enters the evaporation space 25, while the vapour flow 12 enters the condensation space 24. The vapour flow 12 will condense against the condensation wall of the separation barrier 26, transferring its latent heat (and possible part of its sensible heat) into the separation barrier 26. The liquid flow 5 will flow along the separation barrier 26, and evaporate partly, driven by its own heat content, and by the heat received from the separation barrier 26, coming from the condensation process of the vapour flow 12. The condensation process in the condensation space 24 produces a distillate flow 9, which is captured at the bottom side of the first effect 21. In the evaporation space 25 a new vapour flow 12 is produced, which is at a lower temperature as the original vapour flow 12 that entered the condensation space 24 of the first effect 21. The non-evaporated feed flow leaves the effect as a new hot liquid flow 5, which is at a lower temperature as the original liquid flow 5 that entered the evaporation space 25 of the first effect 21. These new flows 5 and 12 are transferred to the next effect 121, where the exact same condensation/evaporation process will take place as described for the first effect 21, with the difference that the pressures and temperatures inside the condensation and evaporation spaces 24 and 25 of the second effect 121 are lower than those in the first effect 21. The pressures and temperatures inside the condensation and evaporation spaces 24 and 25 of the third effect 221 are lower than those in the second effect 121. The pressures and temperatures inside the condensation and evaporation spaces 24 and 25 of the third effect 321 are lower than those in the second effect 221, etc.

Each effect, including the cooling module 22 which condenses the last vapour flow 12 coming from the third effect 321, in the illustrated embodiment, produces distillate 9, which is collected at a collection point 10, and released (pumped out) in flow 11. The non-evaporated feed 6 leaving the last, third effect 321 is called the concentrate (or brine when containing mainly salts), and is also released (pumped out). It is observed that each effect operates at a lower pressure than the previous effect. Furthermore, the setting of the pressures in the various effects 21, 121, 221, 321 may occur automatically.

In a first application, the apparatus is used for generating clean water from a salt-containing feed, such as the generation of potable water from sea water. In a second application, the apparatus is used for generating process water or demineralized water that should meet predefined limits with respect to impurities from any source. In a further application, the apparatus may be used to concentrate a feed by removal of water. This may be done in order to minimize waste, and/or for recycling of the concentrate. The primary contaminant in the feed and the concentrate may be salt, in which case the concentrate is typically referred to as brine. The primary contaminant may alternatively be a non-ionic solute, such as a small molecule, or be an acidic solute, such an inorganic or organic acid, which is more or less ionic in dependence of pH and concentration. The solute may furthermore be a type of molecule that could be a solvent by itself when present in sufficient concentration, such as an alcohol. Rather or in addition to a solute, the feed may contain microscopic particles, such as nanoparticles.

It is deemed an advantage of the present embodiment of the invention, wherein use is made of a hydrophilic wicking material, that the evaporation of water as compared to other compounds in the feed may be increased. Due to the adhesion of water to the wicking material, the effective surface area is enlarged, which results therein that cohesion forces between water molecules are more easily overcome.

FIG. 2 diagrammatically shows the first stage 21 of the apparatus in more detail. In accordance with a preferred embodiment of the invention, the first stage 21 is subdivided in a housing or vessel 30, including any connections, inlets and outlets, and a disposable cartridge 31, which essentially comprises the separation barrier 26 defined the condensation space 24 and the evaporating space 25 inside the effect 21. According to the preferred implementation, which will be discussed hereinafter, there is no inlet or outlet connected to the cartridge 31 in a mechanical manner. This is very practical for the placement of a new non-used cartridge 31 and/or removal of a used cartridge into the vessel 30. Moreover, this design of 'free' connections fit to the separation barrier in use, which will be further discussed with reference to FIG. 3 and beyond. However, it is not excluded that one or more physical connections may be made between the cartridge 31 and the vessel 30 or any means in the vessel 30. For instance, one may provide a distributor of feed water in the form of a tubing or distributor that is physically connected to an upper side of the separation barrier 26 or any intermediate element configured to receive such tubing or distributor. Additionally, instead of providing a brine channel that is arranged to extend to a bottom side a connector type connection may be used. It is noted that the position and size of the orifices (inlets, outlets) depicted in FIG. 2 is not necessarily representative for the actual orifices, and is shown for clarification purposes only.

The housing 30 of a particular effect is a vessel comprising one or more materials that are resistant against temperatures, pressures, feed waters and distillate as they follow from the operational conditions of the distillation apparatus 100, and the position of the mentioned effect within this apparatus. Suitably, use is made of steel. To be able to install the cartridge 31 inside the housing 30, and exchange or maintain the cartridge 31 when required, it is necessary to have access to the interior of housing 30 without interfering with the connections and interfaces as will be discussed hereinafter. To create this access, separation line 32 can be used as a physical separation location for opening housing 30 to install or remove the cartridge 31. Alternatively, the housing could be opened at the bottom side of the cartridge 31. The preferred option for opening the vessel 30 for instance depends on the size of the vessel, its use and/or its location. The exact separation configuration, including additional means like seals, o-rings, or other components is not indicated in FIG. 2, for clarity.

The vessel 30 is provided with a plurality of interfaces. At a top side, the feed water inlet 40 and the vapour outlet 43 are present, at which the feed flow 5 enters the vessel 30 and the vapour flow 12 leaves the vessel 30 respectively. The feed water inlet 40 and the vapour outlet 43 are suitably embodied as connectors that allow for connecting piping. Inside the vessel 30, two interfaces 41, 42 are defined. A first interface 41 allows the feed flow 5 to be distributed in a controlled way into the evaporation space 25. A second interface 42 allows the vapour flow 12 to be transferred from out of the evaporation space 25 towards the exterior of housing 30, without interference from feed flow 5 which is present in the evaporation space 25 as well.

More downwards is shown a connector 44 for connection of the vacuum line 13. An interface 45 is defined that transfer the vacuum flow into the condensation space 24 of the cartridge 31. This connector 44 and the interface 45 are preferably be arranged in an area 35 that is delimited from outer spaces in the vessel 30. Therefore a sealing 33 is present (on the top side coinciding with separation line 32 and therefore not shown in this FIG. 2). As will be further illustrated with reference to FIG. 6 and beyond, the cartridge 31 and the sealing 33 subdivide the vessel into three main portions that are in this embodiment arranged on top of each other to constitute a "vertical stack": an evaporation chamber (252, shown in FIG. 6), the cartridge 31 with pockets (241, 251 shown in FIG. 6) and a condensation chamber (242, shown in FIG. 6). Functionally, the evaporation chamber 252 belongs to the evaporation space 25, and the condensation chamber 242 belongs to the condensation space 24.

At a bottom side of the vessel a further space 36 is shown, together with a separation line 38. This separation line 38 is a fixed structural part of the housing 30. The space 36 is a collection space for feed water 5 coming from the evaporation space 25 that is not evaporated (also called "the concentrate" or "brine"). Space 36 has got a brine outlet 49 in its exterior wall, which allows for connections of piping that removes concentrate flow 5 from space 36. An interface 46 is installed inside the space 36, which indirectly connects to the evaporation space 25. Most preferably, the interface 46 is embodied as a collecting means for the non-evaporated feed flow 5 coming from the evaporation space 25. The interface 46 further ensures that the non-evaporated feed flow 5 cannot interfere with other flows to and from the condensation space 24. Another space 37 is present on the opposed side of the separation line 38. Whereas collection space 36 is coupled to the evaporation space 25, space 37 is coupled to the condensation space 24. As will be apparent from FIG. 9, this space 37 does not need to correspond to a physical space separate from the condensation chamber 242. Rather, typically, it will be the condensation chamber 242.

The vessel 30 further comprises a distillate outlet 50 for outgoing distillate flow 9 and a vapour inlet 51 for incoming vapour flow 12 installed in its exterior wall. An interface 47 for distillate flow 9 and an interface 48 for vapour flow 12 are also provided. The interface 47 is a collecting means for the distillate flow 9 coming from the condensation space 24. The interface 48 is a regulating means for the vapour flow 12, so as to ensure that the vapour flow 12 can flow in an unhindered manner into the condensation space 24, without interference from distillate flow 9 and the non-evaporated liquid feed flow 5. Hence, in accordance with a preferred embodiment of the invention, the distillation stage is subdivided between a vessel and a cartridge, wherein inlet and outlets and any interfaces for the provision and removal are arranged in the vessel, and particularly such that no direct contact or perhaps merely one contact is required between the cartridge and the vessel for the provision and removal of liquids and vapours.

FIG. 3-6 show schematically a preferred embodiment of the cartridge 31 of the invention. FIG. 3 is a bird's eye view on the cartridge from its outside. FIG. 4 shows a view of the cartridge in a partially unrolled form. FIG. 5 shows a top view of the cartridge (corresponding to a cross-section along the line A-A in FIG. 4) and FIG. 6 shows a cross-sectional view in the vertical plane, along the lines B-B as indicated in FIG. 3. The illustrated cartridge 31 is a spirally wound version. As shown in FIG. 4, the cartridge of the illustrated embodiment comprises a plurality of sheets 201-204, which are rolled up.

In this particular version of a spirally wound cartridge 31, an inner cylinder 200 is used as center member of the cartridge 31. The cylinder 200 is chosen to be sufficient rigid to resist the forces that will act on the cylinder during manufacturing, and during installation and operation of the cartridge 31 inside the housing 30 (see FIG. 2). Still, the cylinder is suitably hollow or at least provided with positioning means along its axis, for instance cavities at the top and bottom side, so as to enable fixation to mounting means of the vessel. The cylinder 200 is made of a temperature, pressure and feed water resistant material, because the cylinder 200 will come into contact with the feed water flow 5, and will be subjected to the operational temperatures and pressures inside housing 30. Suitably, the cylinder 200 is made of an engineering plastic, such as polypropylene or high-density polyethylene.

FIG. 5a shows another schematic representation of the cartridge in a cross-sectional view. It is herein visible how the spirally wound couple of the first sheet material 201 and the second sheet material 202 constitute, after sealing, spiral chambers 24, 25 defining the condensation space and the evaporation space, in which portion of the first chamber 24 and the second chamber 25 form—in cross-sectional view such as shown in FIG. 6 an interdigitated arrangement, wherein such portion of the first chamber 24 is present between portions of the second chamber 25. While the number of turns in this FIG. 5a is rather limited, it is to be understood that this number may vary depending on the heat source that is available and/or the desired output of the system.

Around the cylinder 200 the following sheets are rolled-up in this embodiment:

a. a first sheet material 201, that acts as a separation barrier between the condensation space and the evaporation space, and contains in this embodiment a carrier film of polypropylene onto which a wicking layer of hydrophilic material is attached, for instance in the form of a fibrous, textile material such as cellulose or viscose;

b. a second sheet material 202, that acts as a separation barrier between the evaporation space and the condensation space. Though not visible in the figure, the first and the second sheet material 201, 202 preferably have an identical construction. However, the second sheet material 202 is arranged upside down into the roll relative to the first sheet material 201. As a consequence the rear sides of the sheet materials 201, 202 (i.e. the carrier sheets) face each other through the intermediate spacer grid 204. When rolled up, the front sides of the sheet materials (i.e. the wicking layers) also face each other, through the intermediate spacer grid 203.

c. a first grid 203, which will function as the spacer and structural member inside the evaporation space 25;

d. a second grid 204, which will function as the spacer and structural member inside the condensation chamber 24.

It is understood that more layers may be present. As shown in FIG. 5 the first and second sheet material 201, 202 are each fixed to the inner cylinder. The spacer grids 203, 204 may be fixed to the inner cylinder 200 as well but this is not necessary. Alternatively, the spacer grids 203, 204 may be connected to the cylinder, while the first and second sheet materials 201, 202 are not fixed thereto, or possibly fixed to one of the spacer grids 203, 204 at a certain location, preferably close to the attachment point to the cylinder 200. While the presence of a first and the second grid 203, 204 is deemed preferable, other implementations of spacers within the chambers are not excluded. In one further embodiment, the first grid 204 is left out entirely, and the separation of the mutually opposed wicking layers is achieved, in use, by means of the vapour pressure of the condensing vapour. For sake of understanding, it is observed that the condensation chamber will be in use at a higher pressure than the evaporation chamber. Typically the pressure difference is in the range of 15-60 mbar (a).

In FIG. 4 a bonding or sealing compound 205 is furthermore visible. This bonding compound provides bonding between the sheets 201 and 202 and the inner cylinder 200, and between the sheets 201 and 202 and the spacer grids 203 and 204, at those locations where bonding and/or sealing is necessary during the manufacturing process, and on those locations where a permanent seal or bond is necessary, or on those locations where a temporal seal or bond is necessary for further process steps. This sealing compound 205 actually has the function to combine the individual sheet materials 201, 202 into the separation barrier 26 that delimits the evaporation space 25 from the condensation space 24 in a manner so that there is no hole or aperture for material transport between the said two spaces 24, 25. This is arranged in after rolling up of the sheets 201-204 the first and second sheet material 201, 202 are sealed to each other by means of the sealing compound 205 on the top side and on the bottom side. However, merely two sheets are sealed together rather than the full roll. The effect hereof is best visible in FIG. 6, wherein the resulting seals are denoted with reference numerals 206, 207. The effect is the formation of a pile of sheets wherein a bottom end of a first sheet is sealed to an adjacent second sheet on one side, and wherein a top end of the first sheet is sealed to an adjacent third sheet on the other side. As a consequence, the sheet materials 201, 202 constitute a barrier 26, that is in alternating order open from the top side and from the bottom side. The sections between the sheets constitute pockets 241, 251 in alternate arrangement and interdigitated. The pockets 251 that are accessible from the top side are part of the evaporation space 25. They are more specifically accessible from the evaporation chamber 251. The pockets 241 that are accessible from the bottom side are part of the condensation space 24, and particularly accessible from the condensation chamber 242. Preferably, the sealing is prepared in that the bonding compound extends further upwards to connect the entire roll together and is then cut off at a desired height.

FIG. 6 shows a longitudinal cross-section cut of the cartridge 31 along the lines B-B in FIG. 3. The sheet materials 201, 202 are shown, with spacer grids 204 and 203 installed in the respective chambers (spacer grids only partly shown in FIG. 4). As can be seen, the pockets 241 of the condensation space are sealed on the top part, with sealing 206. This seal 206 is based on this the sealing material 205 as shown in FIG. 3, though it may also be made in alternative manner. The evaporation space 25 is sealed at the bottom part with sealing 207. The pockets 241 of the condensation space are open at the bottom, allowing for vapour to enter the pockets at the bottom, and distillate that is formed against the walls of these pockets 241, or against the surface of spacer grid 204, to fall down and leave the cartridge 31.

The pockets 251 of the evaporation space are open at the top, from the evaporation chamber 252, allowing for feed water to enter the pockets 251 at the top, flowing down along the walls 201, 202 of these pockets 251, producing vapour at its way down, where the mentioned vapour rises up and leaves pockets 251 at the top into the evaporation chamber 252.

The cartridge 31 is furthermore equipped with two seals at the top and bottom: seal 208 at the top of cartridge 31 constitutes a seal between the outer surface of the cartridge 31 and the wall of housing 30, closing off space 35 at the top (see FIG. 2). Seal 209 in FIG. 6 must form a seal between the outer surface of cartridge 31 and the wall of housing 30, closing off space 35 at the bottom (see FIG. 7).

The inner cylinder 200 of module 31 has also two seals: seal 210 at the top, and seal 211 at the bottom. These seals must seal of the interior section of tube 200 from spaces 35 and 37 in FIG. 2, as the interior of the hollow inner cylinder 200 can be used to transport non-evaporated feed from evaporation space, and this feed must not come into contact with incoming vapour flow 12 or formed distillate flow 9 (see FIG. 2). The location of seals 208, 209, 210 and 211 is not necessary as indicated in FIG. 6; the material and size of all seals 206, 207, 208, 209, 210 and 211 can be chosen depending on effect configuration, operational conditions, or type of feed water. In FIG. 2 the interface 45 is shown, to connect the external vacuum pressure 13 with module 31, making gas transfer from the cartridge 31 towards pumping means 23 (see FIG. 1) possible. Also interface 46 was shown in FIG. 2, to act as connecting element between module 31 and housing 30, for transfer of feed flow 5 from module 31 to the outside of housing 30. To make both the gas transfer and fluid transfer possible, two passages are defined in FIG. 6:

a. Passage 212, which allows non-evaporated feed that collects at the bottom of the evaporation pockets 251 of the cartridge 31, to be transferred to the inside of the inner cylinder 200. The exact dimension, shape and radial location of passage 212 is not indicated in FIG. 6, as this can differ depending on operational conditions, feed water type, and manufacturing process. One requirement for passage 212 is that it is located as close to the top of the bottom seal 207 (seen in a longitudinal direction) as possible, to avoid that non-evaporated feed can collect inside the pockets 251 of the evaporation space and cannot be evacuated, but rather might damage the sheet material 201, 202.

b. Passage 213, which allows gasses (condensable and non-condensable) to be evacuated from the cartridge 31; the passage 213 is located inside the condensation space 24, and preferably in a top section, to avoid that non-condensed vapour evacuates through this passage 213 also, as this would mean product loss.

FIG. 7 shows in a cross-sectional view corresponding to the one of FIG. 6 the vessel 30 in a first embodiment. Regarding specific structural parts inside housing 30, the following components are accentuated in FIG. 7:

a. distributor plate 66. This distributor plate is installed at a top side, delimiting the evaporation chamber 252, and serves as a distribution means for incoming feed flow 5, and is called a "rain plate". The distributor plate 66 is equipped with small multiple orifices 67, that allow the feed flow 5 to pass at a certain flow rate, creating a drop-wise fluid transfer towards into the evaporation chamber 252 and to the cartridge to be inserted. While FIG. 7 shows a water distributor in the form of a plate, such water distributor may alternatively be provided as a ring, as will be elucidated further with reference to FIGS. 12 and 13 b. Center tube or core cylinder 68. This tube is a structural part of housing 30, and furthermore acts as a guidance and sealing part in combination with the cartridge 31. As can be seen in FIG. 7, center tube 68 is a positioning guide, and optionally a fixing point for the removable part of housing 30. Center tube 68 is also a position point and structural member for installation of the cartridge 31, and a sealing means for the cartridge 31, and in particular towards the inner cylinder 200 of module 31, sealing off a brine space where non-evaporated feed is collected through passage 212 at the bottom of module 31.

c. Mounting means 69, in this embodiment defined as a collection tray 69, which acts as support and positioning surface for the cartridge 31, and provides a sealing surface for the bottom seals of the inner cylinder 200 of the cartridge. Tray 69 collects non-evaporated feed flow 5 on its surface; drain tubes 70 allow for transfer of feed flow 5 towards a bottom compartment 36, wherein this non-evaporated feed can be collected and be let to a brine outlet 63. As indicated in FIG. 5a, tray 69 can have an edge around its circumference, to avoid spilling of feed into the condensation chamber 242 when the cartridge 31 is removed.

d. Bottom plate 71, which separates the condensation chamber 242 from the bottom compartment 36. This separation is highly desired to avoid cross-contamination of the clean vapour and distillate in the condensation chamber 242 with the contaminated non-evaporative feed from the bottom compartment 36.

e. Retainer 72. This component keeps the cartridge 31 in its position and pressed against tray 69 during installation and operation of the effect 21. This retainer can be for example of the clamping type, or be equipped with thread so it can be used as a pressing element against the cartridge 31, by screwing retainer 72 into a lower position, as required. The exact layout and dimension of retainer 72 is not detailed in FIG. 7.

FIG. 9 shows the situation where a cartridge 31 is installed inside a first embodiment of housing 30. As can be seen, the different seals plus inside structures of the housing come together to form the different spaces that were defined in FIG. 2. Also indicated in FIGS. 7 and 9 are the different orifices that must be installed in the structure of housing 30 (interior and exterior) to make transfer of fluids and gases to and from the housing 30 and cartridge 31 possible. The location, dimension and shape of these orifices in FIG. 9 are not necessarily realistic, and serve for clarification purposes only.

Orifice or feed water inlet 60 is found in the top part of housing 30, and allows for access to the evaporation chamber 252. The orifice and a top compartment following thereon are located in the removable part of the housing 30 that allows for access to space 35, to install or remove cartridge 31. The separation of this removable part of housing 30 and the fixed part is indicated with separation line 32. Through orifice 60 feed flow 5 can enter the evaporation chamber 252 and thus also the pockets 251 (see FIG. 6).

Orifice or vapour exit 61 is also located in the removable top part of housing 30, and allows for vapour flow 12 transfer from the evaporation chamber 252 towards the exterior. A particular extended version of orifice 61 is indicated in FIG. 11: orifice 61 is here formed and extended by introducing a tube that runs through the exterior wall of housing 30, but also through the distributor plate 66. This preferred version allows for a more efficient collection of vapour flow 12 that rises up from the cartridge 31, while keeping this vapour flow 12 separated from feed flow 5 which is also present in the evaporation chamber 252. This collection tube is necessary as the vapour volume and rate produced is too large to pass in a workable flowrate through rain plate orifices 67 (in FIG. 7)

Orifice or distillate outlet 62 is located in the exterior wall of housing 30, at the part where the condensation chamber 242 is located. The condensation chamber 242 serves as a collection space where vapour flow 12 coming from a previous space enters, as well as distillate formed inside the cartridge 31. Orifice or distillate outlet 62 allows for distillate flow 9 to be transferred towards the exterior of housing 30. The size of this orifice 62 is designed such, that a maximum distillate flow 9 defined by the operational condition of the particular effect can be transferred through this orifice 62 with a sufficient flow rate, while the orifice is suitably small enough to reduce the leaking of vapour flow 12 to a certain minimum, to avoid product loss.

Orifice or brine outlet 63 is located in the bottom part of housing 30, at the location of bottom compartment 36, where non-evaporated feed coming from module 31 is collected. Orifice 63 allows for transfer of this feed flow 5 towards the exterior.

Orifice or vapour inlet 64 is located in the bottom part of housing 30 and gives access to the condensation chamber 242, where vapour flow 12 coming from the previous effect (or heating module) is presented to the entrance of the condensation space 24 of the cartridge 31. Orifice 64 allows for transfer of vapour flow 12 into the condensation chamber 242.

Orifice 65 or vacuum connection is located the exterior wall of housing 30 where the space 35 is located. This orifice allows for evacuation of gasses from module 31, towards vacuum circuit 13 (see FIG. 1).

It can be seen in this FIG. 9, that the first distillation stage 21 actually is subdivided into three portions: an upper portion, denoted as the evaporation chamber 252, a middle portion 35 in which the cartridge 31 is arranged and the vacuum connection 65 extends, and a lower portion, denoted as the condensation chamber 242. The separation barrier 26 defines the wall between the pockets 241 and 251 that are respectively part of the condensation space and the evaporation space.

FIGS. 10 and 11 demonstrates a second embodiment of the distillation stage 21. FIG. 10 corresponds to FIG. 8 and shows another rain plate 66. FIG. 11 corresponds to FIG. 9 and shows the combination of the vessel 30 and the cartridge 31. In FIG. 11, the removable top part of housing 30 is again defined by separation line 32, which now has a different route. As can be seen, center tube or core cylinder 68 is now open at the top, and is extended by another tube 73, which tube is not attached to center tube 68. Extension tube 73 is part of the removable top part of housing 30, and runs through and is attached to rain plate 66. Where tube 73 protrudes through the top lid of housing 30, the orifice 64 is now located. Tube 68 has a number of orifices 74 installed at the bottom part, where the exact number and dimension of these orifices is determined depending on operational conditions of the effect 21. In this way, tube 68 now has become part of space 37 in FIG. 2: between tube 68 and tube 73 sealing 214 is installed, to maintain a complete separation between the condensation space 24, comprising the condensation chamber 242 and the pockets 241 and the evaporation space 25, comprising the evaporation chamber 252 and the pockets 251. Connecting vapour flow 12 at the top of effect 21 as demonstrated in FIG. 11, to transfer the vapour using the interior of tube 68, can have economical and dimensional (footprint) advantages over the embodiment showed in FIG. 9. It is not expected that the overall performance of the effect will change as a result of this alternative embodiment.

FIG. 12 shows a third embodiment of a water distributor 66 in a diagrammatical bottom view. The distributor 66 of this embodiment is provided a ring-shaped element. Located within said distributor 66 is an annular channel 168 in which pressurized feed flows. The feed inlet 60 allows the feed to enter into such annular channel 168. A pump will be present to provide the required pressure, which is preferably in the range of 0.5-2 bar (atmospheric). The pressurized feed is thereafter distributed into the evaporation space 25 via elements 67, which are for instance embodied as nozzles or orifices. While not indicated in the present FIG. 12, it is foreseen that the annular channel 168 and preferably the entire ring-shaped distributor 66 constitutes a hollow device, such that the pressure in the evaporation space will remain lower than that in the channel 168. It is for sake of completeness added, that this FIG. 12 furthermore shows the extension tube 73 that runs through the distributor 66, which may constitute part of a flow path 12 for vapour coming from a preceding stage (or effect) or from elsewhere. FIG. 12 also shows the presence of a passage 61 (or steam outlet), through which vapour is led out of the evaporation space 25, so as to be condensed in a condensation space 24 of a subsequent stage, or alternatively (particularly at one end) in a condenser.

FIG. 13 shows the third embodiment of the water distributor 66 of FIG. 12, while in use. Herein it is visible how the nozzles 67 spray the feed into the evaporation space 25. Each of the nozzles 67, in this embodiment in total three, which is deemed preferable but not essential, is arranged so as to prevent that the feed is injected into the steam outlet 61. Furthermore, the feed is sprayed into the evaporation space to create a rather uniform distribution.

FIG. 14 is a graph showing the heat transfer coefficient (HTC, conventionally expressed in $kW/m^2/K$) as a function of the feed flow (expressed in liters/min per distillation stage). Herein, use was made of a cartridge of the type shown in FIG. 6 with a water distributor as shown in FIG. 12. The sheet material was based on an engineering plastic, such as polypropylene, which was provided on one side with a wicking layer. The wicking layer contained 100% rayon (viscose). However, it was found that the viscose content may be decreased, for instance to 40%, or to 60% or to 80%, with the remainder being an engineering plastic, which is preferably identical to the engineering plastic used for the sheet material. The total thickness of the sheet material and the wicking layer was 0.21 mm. The viscose is suitably provided as spunlace material, for instance from Lidro™, with a density of 57 $g/m^2$ for the viscose. When mixed with engineering plastic, the density increases to f.i. 100 $g/m^2$. A polypropylene spacer grid was used with a thickness of 8 mm. The cartridge was inserted into a vessel in a manner shown in FIG. 11. In the test set up, tap water as available in Eindhoven, the Netherlands, was used as feed. The feed water heated prior to entry into the distillation stage by means of a domestic boiler to 70° C.

The heat transfer coefficient was identified by measuring both the heat input into the system and the heat output of the system, as measured in the condenser of the system. A series configuration of distillation stages was used. The number of distillation stages was 2 or 3 in the experiments. As a consequence, the power going through each stage is practically the same as the power extracted in the condenser. The said difference per distillation stage was subsequently divided over the active surface area (i.e. the surface area of the sheet material) and the temperature difference between the condensation and evaporation chambers.

FIG. 14 is a graph wherein measured data are shown as dots. It can be seen that the system is found to have a heat transfer coefficient HTC between 1.0 and 2.0 $kW/m^2/K$ for a range of feed flows. The average was found to be slightly above 1.5 $kW/m^2/K$. This is deemed an excellent value. A typical heat transfer coefficient for a shell and tube heat exchanger between hot and cold water is 0.8-1.5 $kW/m^2/K$. For a vapourizer of steam and an aqueous solution, the transfer coefficient is typically 1.0-1.5 $kW/m^2/K$. The same value applies for a condenser of a (hot) aqueous solution and (cold) water. For other organic liquids, the heat transfer coefficients are typically much lower. The dotted line is based on interpolation of the experimental data and setting its intercept to zero. Based thereon, a stable heat transfer coefficient is obtained when using the system of the invention in a wide feed flow of at least between 0.5 to 2.8 l/min per distillation stage (i.e. one vessel). It is observed that the measurement data appear to provide an operation even beyond said range.

The relevance of an adequate and stable heat transfer coefficient for system operation is high. If the heat transfer coefficient is too low, there will not be good performance. Either the system will get dry or a liquid layer will be formed that is too thick (i.e. the thickness relates to the water layer formed on the wicking layer in the evaporation space). If the heat transfer coefficient turns out adequate only at high feed flows, the performance will not be efficient, as it implies that much feed needs to be pumped around to be evaporated. Moreover, the broad range of suitable feed flows is beneficial for the invention in that it allows variation of the concentration factor of the feed, without major change in system performance. This is relevant as different concentration factors may be desired in different applications. For instance, it may be that a maximum concentration factor is present in that a feed that is too much concentrated would get reactive.

Thus, in summary, the invention relates to a distillation apparatus that is provided with at least one evaporation space in which feed water is evaporated into a vapour and at least one condensation space, in which vapour from a preceding evaporation space is condensed into distillate. The evaporation space and the condensation space are each configured to comprise a chamber and a plurality of interdigitated pockets arranged between said chambers, such that a first pocket of the evaporation space is present between a first and a second pocket of the condensation space, and that the first pocket of the condensation space is present between the first and a second pocket of the evaporation space. The spaces are mutually separated by means of a separation barrier that is configured for transmission of heat and for definition of the interdigitated pockets. The invention further relates to a cartridge for use in said distillation apparatus, to the use of the cartridge in the apparatus, and to the use of the apparatus for the distillation of feed water, particularly into clean water, such as distilled water, process water, potable water, as well as for the reduction of the amount of waste water.

The invention claimed is:

1. A distillation apparatus, comprising a distillation stage having a container, wherein the container is embodied as a vessel comprising a feed water inlet, a vapour inlet, a distillate outlet, a vapour exit and a brine outlet, wherein the vessel is provided with an evaporation space in which a feed water is evaporated into a first vapour and a condensation space in which a second vapour from said vapour inlet is condensed into a distillate, wherein the evaporation space and the condensation space are mutually separated by means of a separation barrier that is configured for transmission of heat and wherein the condensation space is configured for transportation of the distillate to the distillate outlet,
wherein said separation barrier is present in a spiral configuration around an inner hollow cylinder and which separation barrier forms a plurality of evaporation pockets and a plurality of condensation pockets which are interdigitated,
wherein the evaporation space comprises an evaporation chamber and said plurality of evaporation pockets and the condensation space comprises a condensation chamber and said plurality of condensation pockets, wherein the plurality of evaporation pockets and the plurality of condensation pockets are interdigitated such that a first evaporation pocket of said plurality of evaporation pockets of the evaporation space is present between a first condensation pocket and a second condensation pocket of said plurality of condensation pockets of the condensation space, and that the first condensation pocket of said plurality of condensation pockets of the condensation space is present between the first evaporation pocket and a second evaporation pocket of the evaporation space,
wherein the evaporation chamber, the interdigitated pluralities of evaporation pockets and condensation pockets and the condensation chamber are arranged one above the other, wherein the condensation chamber, the vapour inlet and the distillate outlet are disposed at a bottom side of the container, and wherein the condensation chamber is coupled to the vapour inlet and the distillate outlet; and wherein the evaporation chamber, the vapour exit and the feed water inlet are disposed at a top side of the container, and wherein the evaporation chamber is coupled to the vapour exit and to the feed water inlet,
wherein said vessel is further provided with a mounting means for mounting a cartridge and with accessibility means for installation and removal of the cartridge into and from the vessel,
wherein the cartridge comprises said separation barrier, which defines the interdigitated pockets, and said inner hollow cylinder, which inner hollow cylinder is mountable on said mounting means of the vessel, and
wherein the inner hollow cylinder of the cartridge is provided at its inside with a seal for sealing to said mounting means of the vessel.

2. The distillation apparatus of claim 1, wherein the separation barrier is based on a rolled up and mutually separated first and a second sheet material, wherein said first and second sheet material are sealed together pairwise in a manner to combine the individual sheet materials into the separation barrier.

3. The distillation apparatus of claim 2, wherein a first spacer grid and a second spacer grid are rolled up with the first and second sheet materials, so that the first sheet material is present between the first and second spacer grids, wherein the first and second sheet materials are spaced apart by said spacer grids.

4. The distillation apparatus of claim 1, wherein the distillation stage is further configured for transportation of a remaining non-evaporated feed water.

5. The distillation apparatus of claim 4, wherein a brine channel is present at a bottom of the evaporation space for transportation of the remaining non-evaporated feed water towards the brine outlet.

6. The distillation apparatus of claim 1, wherein said evaporation space is provided with a wicking layer of hydrophilic material, through which the feed water flows, and an adjacent vapour channel, wherein a condensation wall and the wicking layer are embodied in a sheet material, which is arranged such that the wicking layer is present in the pockets of the evaporation space and the condensation wall is present in the pockets of the condensation space.

7. The distillation apparatus of claim 1, wherein a water distributor is present at a top side of the container for distribution of the feed water onto evaporation surfaces of the pockets of the evaporation space.

8. The distillation apparatus of claim 7, wherein the vessel has an upper compartment that is provided with the feed inlet, which upper compartment is further provided with the water distributor for distributing the feed water onto the evaporation surfaces in the evaporation space, said upper compartment being configured to be kept at a higher pressure during use than a remainder of the container.

9. The distillation apparatus of claim 8, wherein the upper compartment is configured to be at a pressure in the range of 0.5-3 bar.

10. The distillation apparatus of claim 1, wherein the vessel is provided with a core cylinder onto which said mounting means are arranged.

11. The distillation apparatus of claim 10, wherein a space between the core cylinder and the inner hollow cylinder and any cylinder arranged in the vessel below said inner hollow cylinder constitute a brine flow path for flow of non-evaporated feed water from the brine channel towards the brine outlet.

12. The distillation apparatus of claim 1, wherein the mounting means includes a carrier means for carrying said inner hollow cylinder at a predefined height above a bottom of the condensation space in the vessel.

13. The distillation apparatus of claim 1, further comprising an inlet for a connection to a pump for setting a pressure, said inlet being arranged at a height level at which the interdigitated pockets extend.

14. The distillation apparatus of claim 1, wherein a plurality of distillation stages are present as separate entities that are mutually coupled so as to transmit feed water and vapour, wherein particularly a pressure in a second distillation stage is, in use, maintained at a lower level than a pressure in a first distillation stage.

15. A disposable cartridge for use in the distillation apparatus in accordance with claim 1, comprising the separation barrier present in a spiral configuration around the inner hollow cylinder and which said separation barrier forms the plurality of evaporation pockets and the plurality of condensation pockets which are interdigitated, wherein said separation barrier comprises a first sheet material and a second sheet material which are rolled up and mutually separated so as to define a first spiral-shaped cavity and a second spiral-shaped cavity, such that when seen in a cross-section in a vertical plane, said first spiral-shaped cavity and said second spiral-shaped cavity constitute said plurality of evaporation pockets and said plurality of condensation pockets which are interdigitated, such that the plurality of evaporation pockets is part of the first cavity and is accessible from a first side, said plurality of condensation pockets is accessible from a second side and is part of the second cavity, and wherein the separation barrier is at least substantially impermeable for a solute of an aqueous solution,
wherein an inner hollow cylinder is provided at its inside with a seal for sealing to a mounting means of a vessel,
wherein said first sheet material and said second sheet material are sealed together pairwise in a manner to combine the individual sheet materials into the separation barrier.

16. The disposable cartridge of claim 15, wherein a first spacer grid and a second spacer grid are rolled up with the first sheet material and the second sheet materials, so that the first sheet material is present between the first spacer grid and the second spacer grid, wherein the first and second sheet materials are spaced apart by said first and second spacer grids.

17. The disposable cartridge of claim 15, wherein the separation barrier comprises an impermeable layer that is impermeable for a solute of an aqueous solution and a wicking layer of hydrophilic material, wherein the first and second sheet materials are mutually reversed in the roll-up such that the wicking layer is exposed in the pockets accessible from the first side and the impermeable layer is exposed in the pockets accessible from the second side.

18. A method of assembly of the distillation stage of the distillation apparatus in accordance with claim 1, comprising:
providing a disposable cartridge comprising the separation barrier present in the spiral configuration around the inner hollow cylinder and which separation barrier forms the plurality of evaporation pockets and the plurality of condensation pockets which are interdigitated, wherein said separation barrier comprises a first sheet material and a second sheet material which are rolled up and mutually separated so as to define a first spiral-shaped cavity and a second spiral-shaped cavity, such that when seen in a cross-section in a vertical plane, said first spiral-shaped cavity and said second spiral-shaped cavity constitute said plurality of evaporation pockets and said plurality of condensation pockets which are interdigitated, such that said plurality of evaporation pockets is part of the first spiral-shaped cavity and is accessible from a first side said plurality of condensation pockets is part of the second spiral-shaped cavity and is accessible from a second side, and wherein the separation barrier is is at least substantially impermeable for a solute of an aqueous solution,
wherein said first sheet material and said second sheet material are sealed together pairwise in a manner to combine the individual sheet materials into the separation barrier, and
inserting said cartridge into the vessel of the distillation stage of the distillation apparatus of claim 1, such that the first side of said cartridge is arranged adjacent said evaporation chamber and the second side of said cartridge is arranged adjacent said condensation chamber.

19. The method of claim 18, wherein an outside of the cartridge is clamped within an outer wall or a further mounting means of the vessel.

20. The method of claim 18, wherein the mounting means include a carrier means for carrying said inner hollow cylinder at a predefined height above a bottom of the condensation chamber in the vessel.

* * * * *